United States Patent
Chapa

[15] 3,675,690
[45] July 11, 1972

[54] END STOP ASSEMBLY FOR AN AUTOMATIC CUT-OFF SAW

[72] Inventor: Ruben F. Chapa, 6411 Rosemead, Pico Rivera, Calif. 90660

[22] Filed: Nov. 6, 1970

[21] Appl. No.: 87,383

[52] U.S. Cl. .............................. 143/46 F, 83/80, 143/157 D
[51] Int. Cl. ................................. B27b 27/02, B27b 31/08
[58] Field of Search ................. 143/46 R, 46 F, 47 R, 157 R, 143/157 D, 168, 32 N; 83/80

[56] References Cited

UNITED STATES PATENTS

| | | | |
|---|---|---|---|
| 2,310,152 | 2/1943 | Ronning | 143/46 F |
| 3,019,823 | 2/1962 | Cornell | 143/46 F X |
| 3,455,352 | 7/1969 | Sanders et al. | 143/46 R |
| 2,528,779 | 11/1950 | Pinney | 83/80 |

Primary Examiner—Donald R. Schran
Attorney—Boniard I. Brown

[57] ABSTRACT

An end stop assembly for an automatic timber cut-off saw including an ejector plate having an extended position for receiving the cut-off leading end of each timber and movable through an ejection stroke after cut-off to eject the cut-off end from cutting position. The stop assembly has a stop movable along the timber infeed path for arresting each incoming timber in cutting position and actuating a saw central switch upon retraction of the stop by each timer, and means actuated by the ejector plate for moving the stop to and retaining the stop in extended position upon movement of the plate to extended position and releasing the stop upon retraction of the stop.

9 Claims, 5 Drawing Figures

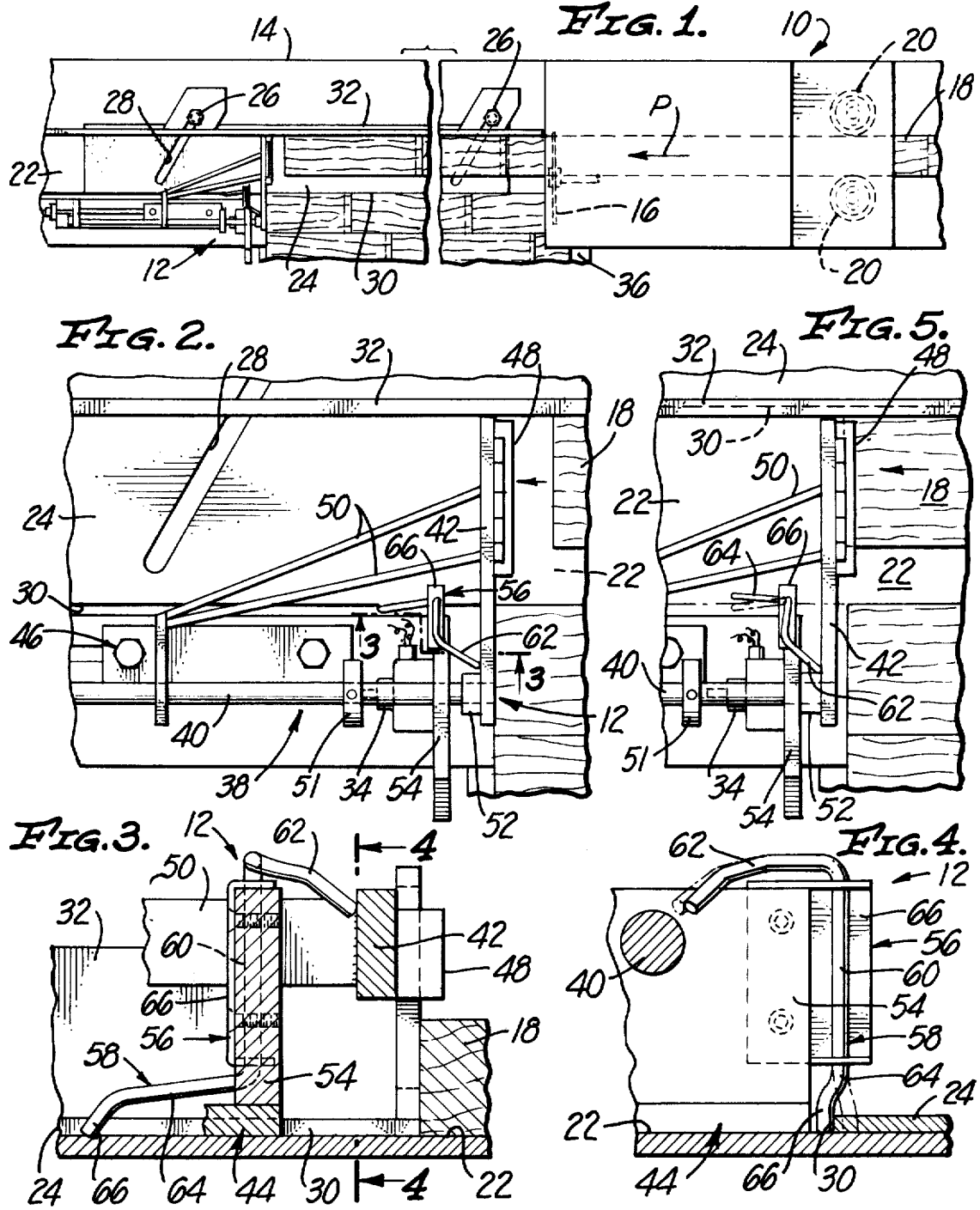

3,675,690

END STOP ASSEMBLY FOR AN AUTOMATIC CUT-OFF SAW

BACKGROUND OF THE INVENTION

1. Field of the Invention

This invention relates generally to wood sawing machines and more particularly to an improved end stop assembly for an automatic cut-off saw.

2. Discussion of the Prior Art

Automatic cut-off saws of the general class to which the invention pertains are designed to cut off to a predetermined length wooden boards, strips, and other long wooden members, hereafter referred to generically as timbers. Such cut-off saws have an elongate frame mounting a rotary saw blade and infeed means for feeding timbers endwise in succession past the blade to a cutting position wherein each timber has a leading end portion of predetermined length beyond the plane of the blade. The leading end of the blade then rests on an extended ejector plate which is movable laterally of the timber infeed path through an ejection stroke involving initial retraction of the plate and final return of the plate to extended position.

Each incoming timber is arrested in cutting position by an end stop. This end stop is retracted against spring action by each incoming timber arriving in cutting position to actuate a saw control switch. Actuation of this switch by each timber inactivates the timber infeed means and initiates cut-off operation of the saw blade and an ejection stroke of the ejector plate to eject the cut-off timber end. Ejection of the cut-off end releases the end stop for return to extended position by spring pressure to engage the next timber. This return of the end stop releases the saw control switch to condition the saw for its next cut-off cycle.

The end stops of the existing cut-off saws have several disadvantages. These disadvantages need not be explained in detail. Suffice it to say that they stem from the fact that the end stop is retracted against spring action by each incoming timber to be recut and then returned to extended position by spring action when the cut-off end of the timber is ejected.

SUMMARY OF THE INVENTION

The present invention provides an improved end stop assembly for a cut-off saw of the class described. This improved end stop assembly has an end stop proper for arresting each incoming timber in cutting position and actuating the saw control switch all in essentially the same manner as the existing end stops. The primary feature of improvement of the present end stop assembly resides in end stop return means for positively moving the stop to and yieldably retaining the stop in extended position in response to movement of the saw ejector plate to its normal extended position for receiving the next timber to be cut.

To this end, the end stop return means comprises a relatively stiff resilient member which is engaged by the leading front edge of the ejector plate as the latter returns to extended position following an ejection stroke of the plate in a manner such that the member is moved along a given path by the plate. This member also engages the end stop in a manner such that movement of the member by the returning ejector plate extends the stop. The stop return member yields under the impact of each timber arriving in cutting position with the ejector plate extended to permit actuation of the saw control switch by the stop. Retraction of the plate during its ensuing ejection stroke releases the pressure of the control member against the stop, thus freeing the cut-off timber end for ejection from cutting position.

In the disclosed embodiments, the end stop return member comprises a resilient bell crank lever in the form of a bent rod pivotally supported by the end stop mounting bracket. This rod lever has a lower arm disposed for engagement by the extending ejector plate and an upper arm engaging the stop. Engagement of the lower lever arm by the ejector plate as it arrives in extended position rotates the lever to extend the stop.

BRIEF DESCRIPTION OF THE DRAWINGS

FIG. 1 is a fragmentary plan view of a cut-off saw equipped with a present end stop assembly;

FIG. 2 is an enlarged plan view of the end stop assembly;

FIG. 3 is an enlarged section taken on line 3—3 in FIG. 2;

FIG. 4 is a section taken on line 4—4 in FIG. 3; and

FIG. 5 is a view similar to FIG. 2 showing the parts in another position.

DESCRIPTION OF THE PREFERRED EMBODIMENT

The drawings illustrate an automatic cut-off saw 10 equipped with an improved end stop assembly 12 according to the invention. Except for the end stop assembly 12, saw 10 is conventional and thus need not be explained in elaborate detail. The saw has an elongate frame 14 mounting a rotary saw blade 16 in a transverse cutting plane of the frame. This saw blade is driven by a motor (not shown) and is supported on the frame for edgewise movement in its plane for sawing timbers 18 to be cut off.

Mounted on the frame 14 to the right of the saw blade are a pair of infeed rollers 20 for feeding each timber 18 endwise past the saw blade 16 along an infeed path and normal to the plane of the blade to a cutting position. In this cutting position, the cutting plane of the blade intersects the timber a predetermined distance from its leading end face, such that the timber has a leading end portion of predetermined length beyond the plane, i.e., to the left of the plane in FIG. 1.

The portion of frame 14 to the left of the saw blade 16 in FIG. 1 is recessed or stepped down to form a table 22. Slidably supported on this table is an ejector plate 24 which extends from the plane of saw blade 16 to a position adjacent the left end of end stop assembly 12. Plate 24 is attached to the table 22 by bolts 26 which extend through slots 28 in the plate. Slots 28 extend at an oblique angle to the infeed path P, such that the ejector plate is movable laterally of and along a direction line oblique to the path. Means (not shown) are provided for moving the plate 22 between its normal extended position of FIG. 1 and its retracted position of FIG. 5. In extended position, the ejector plate 24 projects forwardly under the timber infeed path P with the upper surface of the plate flush with the upper timber supporting surface of the frame 14 to the right of the plate in FIG. 1 so as to support the leading end of the timber in cutting position. In retracted position, the front edge of the ejector plate is located just to the rear of the infeed path. Extending over the ejector plate 24, along the rear side of the infeed path is a guide fence 32.

During operation of the cut-off saw, the timbers 18 are fed endwise in succession along the infeed path P and are arrested in cutting position by the end stop assembly 12. The leading end of the timber is then supported on the ejector plate 24. As will appear presently, contact of each incoming timber with the end stop assembly actuates a switch 34 to initiate an automatic cut-off cycle of the saw. During this cycle, the infeed rollers 20 are separated by means (not shown) to release them from the timber, thus to inactivate the infeed means, the saw 16 is moved across the infeed path P to cut off the leading end of the timber, and the ejector plate 24 is driven through an ejection stroke by means not shown. This ejection stroke involves initial retraction of the plate to its retracted position of FIG. 5 and final return of the plate to its normal extended position of FIG. 1. In retracted position, the ejector plate releases the cut-off end of the timber in cutting position to drop onto the frame table 22. During final return of the plate to extended position, its front edge 30 engages the cut-off timber end and ejects the latter laterally from cutting position onto an outfeed table 36.

Referring now to the present end stop assembly 12, the latter comprises an end stop 38 including a shaft 40 mounting a crosshead 42 at one end. Shaft 40 is slidably supported by a base or bracket 44. Bracket 44 is attached by bolt and slot means 46 to the saw frame 14 for adjustment parallel to the timber infeed path P. Crosshead 42 is located at the end of the shaft 40 adjacent the saw table 22 and extends laterally across the timber infeed path P. Fixed to the end of the crosshead within the path is a block providing a timber engaging face 48 on the stop. Braces 50 extend between the shaft 40 and the outboard end of the crosshead 42. Shaft 40 mounts a collar 51 for actuating the saw control switch 34.

End stop 38 is movable between its extended position of FIG. 2 and its retracted position of FIG. 5. As will appear presently, the stop normally occupies its extended position and is retracted by contact of each incoming timber 18 with the stop face 48. Retraction of the stop is stopped by contact of a boss 52 on the stop crosshead 42 with the forward upstanding bearing plate 54 of the end stop mounting bracket 44. In this retracted stop position, the timber 18 in contact with the stop face 48 is located in cutting position.

The primary feature of novelty of the end stop assembly 12 resides in an end stop return means 56 which is actuated by the ejector plate 24 as the latter approaches its extended position and moves the end stop 38 to and yieldably retains the stop in its extended position. The stop return means 56 comprises a relatively stiff though resilient bell crank lever 58 fashioned from a metal rod. This rod has a central portion 60 providing a journal and upper and lower bent ends 62, 64 providing lever arms. The lever journal portion 60 is journalled in a bearing bracket 66 attached to the forward bearing plate 54 of the end stop mounting bracket 44 for rotation on a vertical axis.

The upper lever arm 62 bears against the rear side of the end stop crosshead 42. The lower lever arm 64 has a downturned end 66 located in the path of the ejector 24 for engagement by the front plate edge 30 as the plate arrives in extended position. During the final travel of the ejector plate following its engagement with the lever arm 64, the plate rotates the lever 58 from its position of FIG. 5 to its position of FIG. 2. This rotation of the lever moves the end stop 38 from its retracted position to its extended position. The lever has a degree of torsional resiliency, such that impact of an incoming timber 18 against the stop with the ejector plate 24 in extended position twists the lever to permit the stop to retract. This retraction of the stop actuates the saw control switch 34 to initiate the automatic cut-off cycle described earlier. Retraction of the ejector plate during the cycle releases the lever 58 for return rotation to its position of FIG. 5 and thereby releases the end stop 38 for return to its retracted position. The pressure of the end stop against the cut-off end of the timber is thus removed and the end is free to drop onto the saw table 22 for ejection by the ejection plate during its return to extended position.

What is claimed as new in support of Letters Patent is:

1. In a cut-off saw for timbers including an elongate frame having a longitudinal timber infeed path and a transverse cutting plane, infeed means for feeding said timbers endwise in succession along said infeed path to a cutting position wherein said cutting plane intersects the timber in cutting position such that the timber has a leading end of predetermined length beyond said plane, a guide fence along the rear side of said path for engaging said leading timber end, a rotary saw blade movable edgewise in said plane to cut off said leading timber end, and an ejector plate below said fence having a normal extended position wherein the plate extends forwardly of said fence to support said leading timber end during cut-off and movable after cut-off through an ejection stroke involving initial rearward retraction of the plate to a retracted position wherein the front plate edge is located below said fence to release the cut-off timber end to drop onto said frame and final return of the plate to its extended position to eject the cut-off timber end, the improvements comprising:

an end stop mounted on said frame for movement along said path to arrest each timber in cutting position, said stop being movable in the direction of timber infeed movement to a retracted position wherein the timber engaging face of the stop is located a predetermined distance from said cutting plane, and said stop being movable in the opposite direction to an extended position, resilient end stop return means actuated by said ejector plate for moving said stop to and yieldably retaining said stop in extended position upon movement of said plate to extended position and releasing said stop for free retraction upon movement of said plate to retracted position, said return means yielding upon contact of an incoming timber with said stop to permit retraction of the stop from its extended position while said ejector plate is extended, and a switch actuated by retraction of said stop for inactivating said infeed means and initiating cut-off operation of said blade and an ejection stroke of said ejector plate.

2. The subject matter of claim 1 wherein:

said stop return means comprises a resilient member mounted on said frame for movement from a first position to a second position by said ejector plate upon movement of said plate to extended position, and said resilient member engages said stop for extending the latter upon movement of said resilient member from said first position to said second position.

3. The subject matter of claim 1 wherein:

said resilient member comprises a bell crank lever pivoted on an axis normal to said plate and having a first arm engageable by said front ejector plate edge upon movement of said plate to extended position and a second arm engaging said stop in a manner such that engagement of said first arm by the extending ejector plate rotates said lever in a direction to extend said stop.

4. The subject matter of claim 3 wherein:

said lever comprises a rod having a central portion coinciding with said pivot axis, a first transverse end forming said first lever arm, and a second transverse end forming said second lever arm, and a bearing on said frame journalling said central rod portion for rotation on said axis.

5. The subject matter of claim 4 wherein:

said stop comprises a shaft, a crosshead on one end of said shaft extending across said path and having said stop face, means mounting said shaft on said frame for endwise movement parallel to said path, and said second lever arm engages the rear side of said crosshead.

6. An end stop assembly for a timber cut-off saw including an elongate frame having a longitudinal timber infeed path and a transverse cutting plane, infeed means for feeding said timbers endwise in succession along said infeed path to a cutting position wherein said cutting plane intersects the timber in cutting position such that the timber has a leading end of predetermined length beyond said plane, a guide fence along the rear side of said path for engaging said leading timber end, a rotary saw blade movable edgewise in said plane to cut off said leading timber end, and an ejector plate below said fence having a normal extended position wherein the plate extends forwardly of said fence to support said leading timber end during cut-off and movable after cut-off through an ejection stroke involving initial rearward retraction of the plate to a retracted position wherein the front plate edge is located below said fence to release the cut-off timber end to drop onto said frame and final return of the plate to its extended position to eject the cut-off timber end, said stop assembly comprising:

a stop having a transverse end face, a base for mounting said stop on said frame for movement parallel to said path with said stop face located in said path for contact by the leading end of an incoming timber to be cut, said stop being movable in the direction of said stop face to an extended position and in the opposite direction to a retracted position, and a resilient stop return member mounted on said base for movement of said member by said ejector plate from a first position to a second position upon movement of said plate to extended position, and said resilient member engaging said stop for moving the stop to and yieldably retaining the stop in extended position upon movement of said resilient member from said first position to said second position and return of said resilient member to said first position by movement of said stop to retracted position.

7. An end stop assembly according to claim 6 wherein:
said resilient stop return member comprises a bell crank pivoted on said base on an axis normal to the direction line of stop movement and having a first arm engageable by said front ejector plate edge upon movement of said plate to extended position and a second arm engaging said stop in a manner such that engagement of said first arm by the extending ejector plate rotates said lever in a direction to extend said stop.

8. An end stop assembly according to claim 7 wherein:
said lever comprises a rod having a central portion coinciding with said pivot axis, a first transverse end forming said first lever arm, and a second transverse end forming said second lever arm, and
a bearing on said base journalling said central rod portion for rotation on said axis.

9. An end stop assembly according to claim 8 wherein:
said stop comprises a shaft, a crosshead on one end of said shaft extending across said path and having said stop face, and said base comprises a bracket supporting said shaft for endwise movement, and
said second lever arm engages the rear side of said cross-head.

* * * * *